June 12, 1923.                                                            1,458,167
S. DAVIDSON
METHOD OF AND APPARATUS FOR FEEDING MOLTEN GLASS
Filed Jan. 29, 1921      3 Sheets-Sheet 2
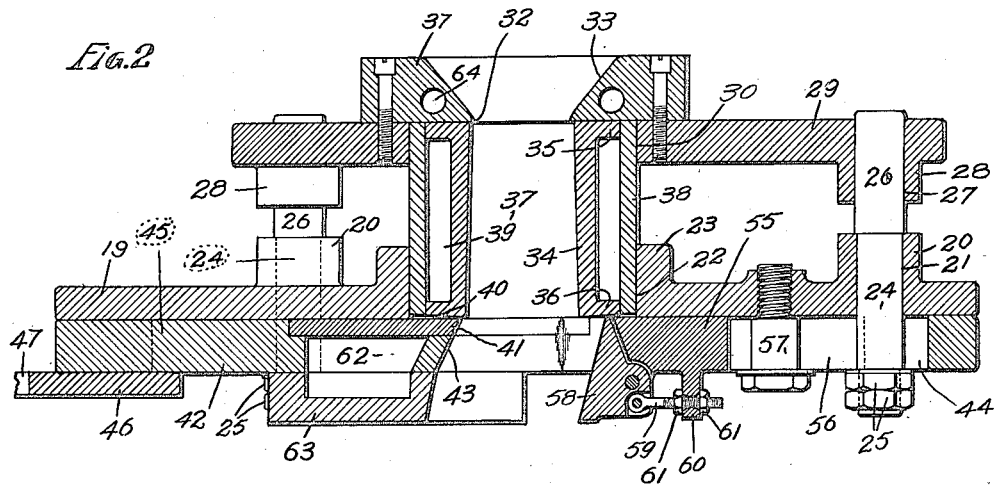
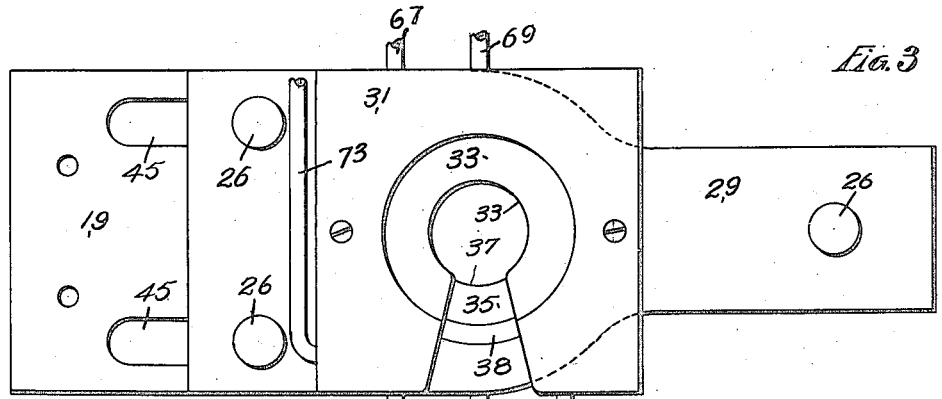
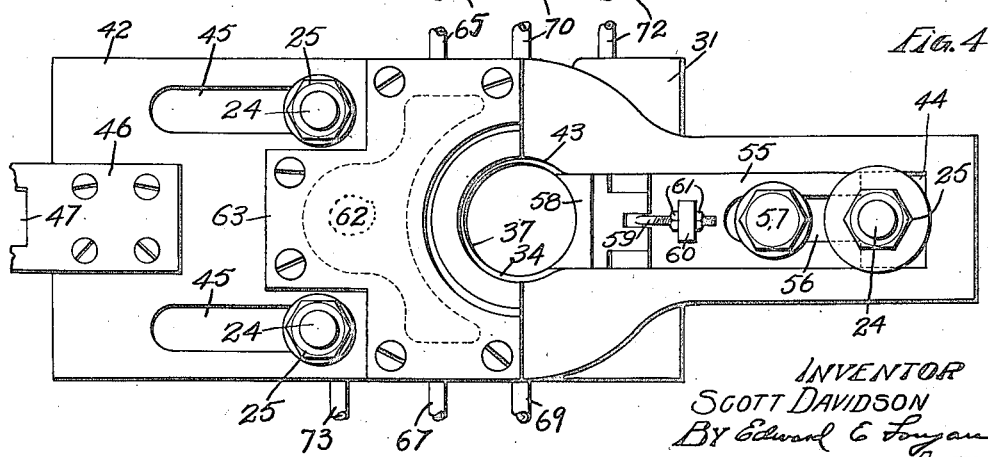
INVENTOR
SCOTT DAVIDSON
BY Edward E. Longan
ATTY.

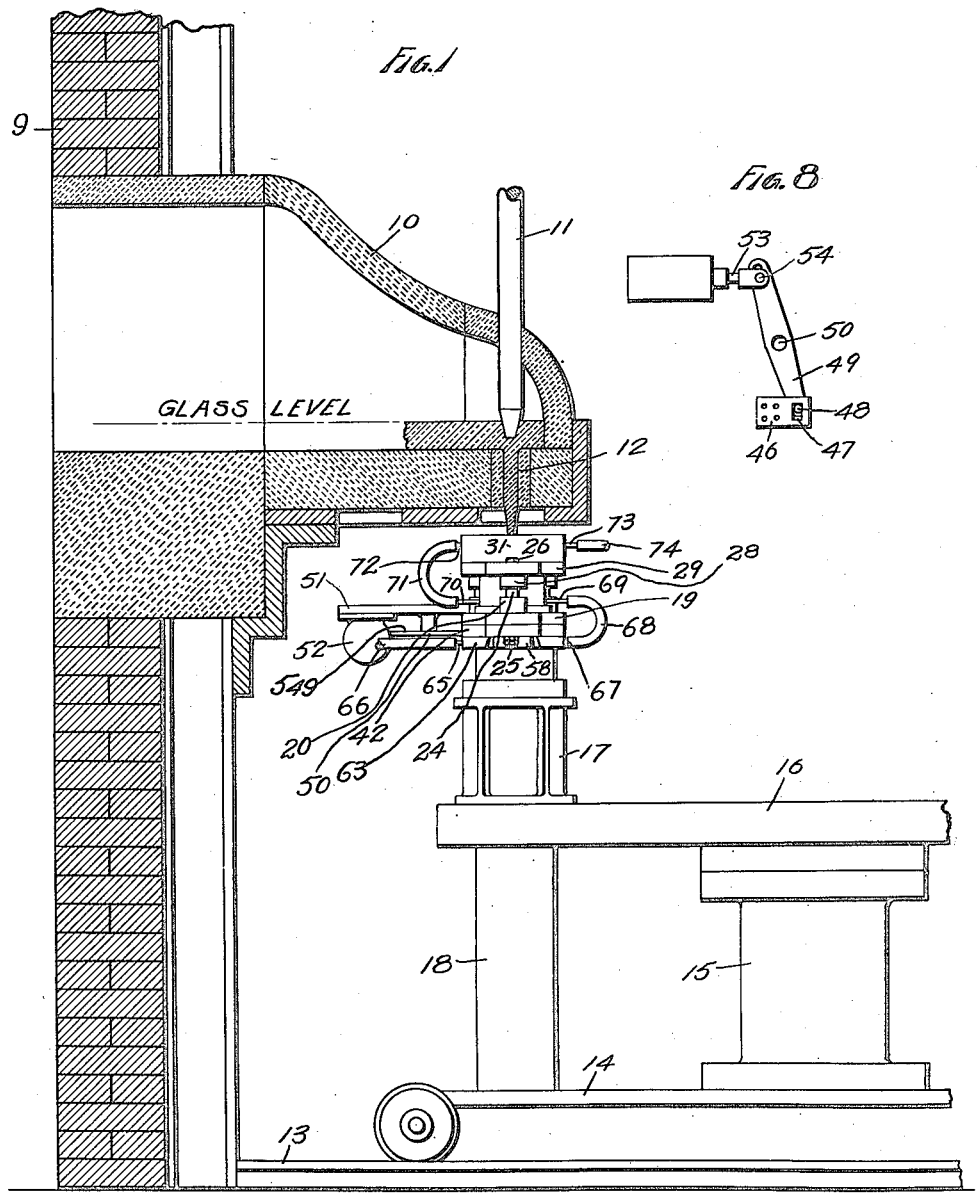

June 12, 1923.

S. DAVIDSON 1,458,167

METHOD OF AND APPARATUS FOR FEEDING MOLTEN GLASS

Filed Jan. 29, 1921  3 Sheets-Sheet 3

INVENTOR
SCOTT DAVIDSON
BY Edward E. Longan
ATTY.

Patented June 12, 1923.

1,458,167

UNITED STATES PATENT OFFICE.

SCOTT DAVIDSON, OF HILLSBORO, ILLINOIS, ASSIGNOR TO SCHRAM GLASS MANUFACTURING COMPANY, OF ST. LOUIS, MISSOURI, A CORPORATION OF MISSOURI.

METHOD OF AND APPARATUS FOR FEEDING MOLTEN GLASS.

Application filed January 29, 1921. Serial No. 440,915.

*To all whom it may concern:*

Be it known that SCOTT DAVIDSON, a citizen of the United States and resident of the city of Hillsboro, county of Montgomery, and State of Illinois, has invented certain new and useful Improvements in Method of and Apparatus for Feeding Molten Glass, of which the following is a specification, containing a full, clear, and exact description, reference being had to the accompanying drawings, forming a part hereof.

This invention relates to improvements in the method of and apparatus for feeding molten glass, and has for its primary object a one-piece or non-partible floating gathering cup, which is movable vertically and which can also be rotated.

A further object is to construct an apparatus having a floating gathering cup below which is placed an adjustable guide lip, which is for the purpose of conducting the end or tail of the severed stream into the mold.

A still further object is the method of feeding molten glass into molds by imparting to it a sudden downward rotary motion, which frees it from the sides of the gathering cup and allows it to drop into the mold.

In the drawings:

Fig. 1 is a fragmental section of a glass furnace with my improved device in position.

Fig. 2 is an enlarged vertical sectional view of my improved device.

Fig. 3 is a top plan view of the same.

Fig. 4 is a bottom plan view.

Fig. 8 is a diagrammatic view showing the operating means by which the knife or shearing member is operated.

Figure 5:
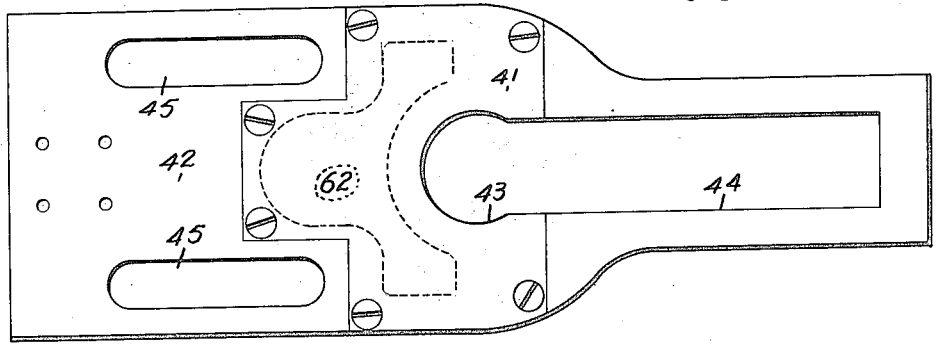
Fig. 5 is a top plan view of the severing knife.
Figure 6:
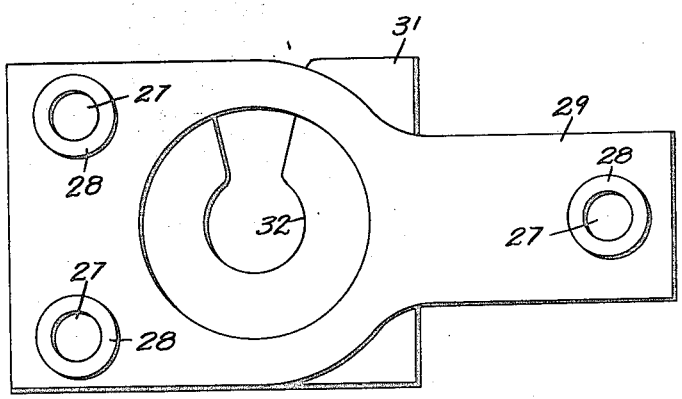
Fig. 6 is a bottom plan view of the upper plate.
Figure 7:
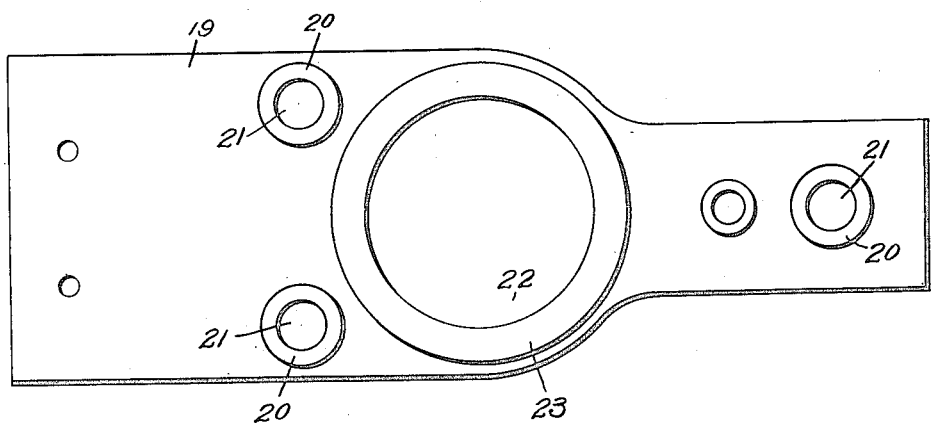
Fig. 7 is a top plan view of the lower plate.

In carrying out my invention I employ a glass furnace 9, which is equipped with the usual boot 10, the regulating valve 11 and the glass outlet 12. Secured to the floor is a plurality of rails 13 on which is mounted a carriage 14. This carriage is provided with a standard 15 on which the rotary mold table 16 is pivotally secured. Secured to the mold table 16 are a plurality of molds 17. These molds may be of any desired number, shape or size. Secured to the carriage 14 is a bracket 18, its upper end being secured to the lower plate 19. This lower plate is provided with bosses 20 through which openings 21 are formed and with the enlarged opening 22. This enlarged opening is surrounded by an upwardly extending flange 23. This flange acting as a guide for the lower part of the gathering cup. Extending through the openings 21 are studs 24, which are screw threaded on their lower ends to receive the nuts 25, their upper ends being provided with the enlargement 26. This enlargement prevents the studs 24 from passing downward through the openings 21 formed in the bosses. The enlarged portion 26 extends through openings 27 formed in the bosses 28, which are formed integral with the upper plate 29. The upper plate 29 is loosely mounted on the studs 26 so that it may have vertical movement. The plate 29 is also provided with an opening 30. This opening being directly above the opening 22 and of the same diameter and is for the purpose of receiving the upper portion of the gathering cup. Secured to the top surface of the upper plate is a funnel 31. This funnel is provided with a central opening 32 and with an outwardly and upwardly flaring wall 33. This is for the purpose of receiving the glass as it issues from the furnace and directing it into the gathering cup. The gathering cup consists of a cylindrical member 34, which is provided at its upper and lower edges with outwardly extending flanges 35 and 36. The cylindrical member 34 is also provided with a central opening 37. This opening is tapered, the opening at the upper edge being of less diameter than that at the lower edge,—the opening of the upper edge is, however, slightly larger than the opening 32 formed in the funnel 31. Secured to the cylindrical member 34 is a sleeve 38, which is preferably shrunk in place. This leaves the space 39, which forms a water jacket for the gathering cup. The lower edge of the gathering cup is tapered as indicated by the numeral 40; that is, the edge or bottom is inclined upwardly from the lower edge of the opening in the gathering cup to the outside edge thereof. This leaves a sharp or cutting edge against which the upper edge of the severing blade 41 acts.

This severing blade is attached to the severing knife or shearing member 42 by means of screws. The severing knife or shearing member 42 is provided with a circular outwardly and downwardly flaring opening 43 and with the slot 44, this slot being somewhat narrower than the opening 43. The severing knife is also provided with slots 45 through which two of the studs 24 pass, the other stud passing through the slot 44. These slots are for the purpose of slidably securing the severing knife to the lower plate 19. Secured to the underside of the severing knife 19 is a link 46. This link is provided with a slot 47 into which a pin 48 extends. This pin is secured to one end of a lever 49. This lever is pivoted at a point indicated by the numeral 50 to a bracket 51, which bracket may be formed integral with the bracket 18, or may be secured to the carriage 14 in any well known manner. The bracket 51 also carries the air cylinder 52, which has a piston 53 located therein. This piston is connected to the end 54 of the lever 49 and is for the purpose of operating the cutting knife backward and forward. This operation of the knife may be controlled by hand or it may be synchronized with the movement of the mold table in any well known manner. Secured to the lower plate 19 and passing through the slot 44 is a casting 55. This casting is slotted at its rear end as indicated by the numeral 56, which is for the purpose of allowing the introduction of the stud 57 by which the casting is secured to the plate 19, and also to allow the casting to straddle the stud 24, which extends through the slot 44. Hingedly connected to the front of the casting 55 is an adjustable lip or guide 58. The inclination of this lip or guide is controlled by means of the adjusting screw 59, which is passed through the lug 60 formed integral with the casting 55 and by means of the nuts 61, which are located on either side of the lug 60. The knife 42 is provided with a recess 62, which forms with the recessed casting 63 a water jacket for the blade 41. The funnel 31 is also provided with a water jacket 64.

My method of connecting and water-jacketing the several parts is as follows:

The water jacket for the blade 41 has extending into it a pipe 65 to which a flexible conductor 66 is secured,—this conductor leading to any suitable source of water supply. Opposite the pipe 65 is a pipe 67, which is connected to a flexible conductor 68, this conductor is in turn connected to a pipe 69, which extends into the water jacket 39 of the cup. Opposite the entrance of the pipe 69 into the water jacket 39 is a pipe 70, which has connected to it a flexible conductor 71, which in turn is secured to a pipe 72 leading to the water jacket 64, and the outlet of this water jacket is connected to the pipe 73, which in turn has secured to it a flexible conductor 74, which leads to the waste. Thus it will be seen that the water used for cooling purposes first enters the cutting knife, from there it is conveyed to the cup and from the cup to the funnel, whence it passes into the waste. I may, however, vary these connections as found desirable by connecting each separate water jacket with a source of supply, or I may reverse the flow of the water or connect the jackets up in pairs, only; that is, either the funnel and cup and cool the knife separately, or the knife and cup and cool the funnel separately, or the knife and funnel and cool the cup separately.

It will also be noted that the entire device is located beneath the boot and separate therefrom and also that the gathering cup is non-partible and has an opening, which is larger at the bottom than at the top; in other words, the opening is frustrum conical in shape. It is also to be noted that the opening 43 is slightly larger than the outlet of the gathering cup.

The operation of my device is as follows:

After the glass has been melted, a regulated flowing stream is established by operating the regulating valve 11 so that the stream will flow with the required rapidity and volume. The carriage 14 is then moved forward so as to bring the funnel 31 below the on-coming stream, the knife 42 is operated forward severing the stream. This knife remains forward so that the bottom of the cup will be closed, the table is then rotated and a mold brought into position beneath my device. The on-coming glass is now supported by the plate or blade 41 after a predetermined amount of glass has been gathered, which may be either the full amount necessary to make a finished article or any portion thereof, the knife 42 is moved backwardly. During this movement of the knife the cup is given a rotary motion due to its flexible connection with the knife and at the same time on account of the size of the opening 43, the cup together with the upper plate and funnel is allowed to sink down a trifle, and due to the rapid movement of the knife and the inertia of the cup, the cup remains suspended momentarily and then drops. This has a tendency to jar the accumulated mass from the sides of the gathering cup and also imparts to it a slight twisting movement due to the movement of the cup, as before mentioned. If sufficient glass has not been gathered in the cup to form the completed article, live glass is allowed to continue to flow into the mold until the desired quantity has been reached when the knife is again operated forward and the on-coming stream severed. This forward movement of the knife has a tendency to slap the severed end or tail of the stream over. This tail then comes in contact with the guide lip 58, which directs it into the mold and prevents it from "slopping" over and hanging over the top of the mold. My purpose in making the lip 58 adjustable is to give the proper inclination thereto so as to direct this tail and prevent the "slopping" over of the glass.

It has been found extremely difficult to obtain the proper inclination of this guide lip when the same was made solid, but by my adjusting feature the device can be quickly made and installed and then regulated so that the proper inclination can be obtained.

As previously pointed out, the gathering cup is aptly termed a one-piece or non-partible floating cup and it is capable of movement vertically and is also rotatable. These movements impart to the gathered batch like movements and facilitates the discharge of the batch into the molds.

It also may be noted that in addition to the foregoing reason for making the guide 58 adjustable, it is also necessary to have this adjustable for different viscosities of the glass.

Having fully described my invention, what I claim is:

1. The herein described method of delivering glass to the moulds of a forming machine, which consists in the establishment of a regulated stream of glass, arresting the downward movement of said stream until a sufficient mass of glass has been accumulated therefrom, supporting said mass along its bottom and its side a predetermined interval, and then first releasing the mass entirely on its bottom and simultaneously during such release imparting to the batch a rotary movement, and immediately subsequent to the release of the batch on its bottom a jolt for assisting the discharge of the batch by gravity.

2. The herein described method of delivering glass to the moulds of a forming machine, which consists in the establishment of a regulated stream of glass, arresting the downward movement of said stream until a sufficient mass of glass has been accumulated therefrom, supporting said mass along its bottom and its side a predetermined interval, and then first releasing the mass entirely on its bottom, and immediately subsequent to the release of the batch on its bottom utilizing the inertia of the gathered batch in addition to gravity to release the same from its side support.

3. A device for delivering batches of glass from a flowing stream to the moulds of a forming machine, consisting of a floating one-piece cup, a shearing member reciprocatingly mounted over the lower end of said cup and acting as a support for said cup, and an adjustable guide carried by said shearing member.

4. A device for delivering batches of glass from a flowing stream to the moulds of a forming machine, comprising a support, a one-piece floating cup whose internal diameter is slightly greater at the bottom than at the top, a water-cooled shearing member located at the lower end of said cup and acting as a bottom therefor when closed, and an adjustable guide located at the lower end of said cup, and means for holding said guide in the desired adjustment.

5. In a device of the class described, a one-piece floating cup having a beveled lower edge and whose internal diameter at the bottom is greater than at the top, a reciprocating water-cooled shearing member located at the lower end of said cup and on which said cup rests, the movement of said shearing member adapted to impart to said cup a vertical movement, an adjustable guide located at the lower end of the cup, and means for holding said guide in the desired adjustment.

6. In a device of the class described, a one-piece floating gathering cup, supports surrounding the upper and lower edges of said cup, a reciprocating shearing member located beneath said cup, said shearing member acting as a support for the bottom of said cup and also as a closure for the bottom of said cup.

7. In a device of the class described, a one-piece floating cup having a beveled lower edge and whose internal diameter is greater at the bottom than at the top, a reciprocating shearing member located beneath said cup and on which said cup rests, a flexible connection between the shearing member and the cup for imparting a rotary movement to said cup, and an adjustable guide located beneath said cup and adjacent its outlet.

8. A device for delivering batches of glass from a flowing stream to the molds of a forming machine comprising an upper and a lower support, a one-piece floating cup loosely mounted in said supports, a shearing member secured to the lower support, said shearing member acting as a closure for the cup and also serving as a support for said cup, an adjustable guide secured to the lower support and in close proximity to the opening in the cup, and means for holding said guide in the desired adjustment.

9. A device of the class described, comprising an upper and lower support, a funnel secured to the upper support, a one-piece cup loosely mounted in said supports, a knife reciprocally mounted beneath the lower support, said knife acting as a support for said cup and as an intermittent closure therefor, and a flexible connection between the knife and cup for imparting a twisting movement to said cup.

10. A device of the class described, comprising a one-piece movable gathering cup having a downwardly and outwardly flaring gathering chamber, a shearing member reciprocally mounted beneath the lower end of said cup and having an opening whose diameter is less at the upper portion than the diameter of said cup, a flexible connection between the shearing member and cup, and means for operating said shearing member and thereby imparting to said cup a vertical and rotary movement.

11. In a device of the class described, a gathering cup provided with a downwardly and outwardly flaring inside surface, a support for holding the cup on a fixed vertical axis, a reciprocating shearing member located beneath said cup and answering as a closure for the bottom thereof, and means for imparting to said cup a bodily vertical movement by the operation of the shearing member.

In testimony whereof, I have signed my name to this specification.

SCOTT DAVIDSON.